United States Patent [19]

Kaneko et al.

[11] Patent Number: 4,967,294
[45] Date of Patent: Oct. 30, 1990

[54] MAGNETIC RECORDING/REPRODUCING DEVICE WHICH DISCRIMINATES RECORDED AND UNRECORDED TRACKS

[75] Inventors: Kiyotaka Kaneko; Izumi Miyake; Yoshio Nakane; Hiroshi Shimaya, all of Tokyo, Japan

[73] Assignee: Fuji Photo Film Co., Ltd., Kanagawa, Japan

[21] Appl. No.: 238,850

[22] Filed: Aug. 31, 1988

[30] Foreign Application Priority Data

Aug. 31, 1987 [JP] Japan .................................. 62-217729

[51] Int. Cl.$^5$ .............................................. G11B 5/55
[52] U.S. Cl. ................... 360/78.13; 360/78.04; 360/78.08
[58] Field of Search ................. 360/78.04, 78.13, 78.08

[56] References Cited

U.S. PATENT DOCUMENTS

| | | | |
|---|---|---|---|
| 4,698,702 | 10/1987 | Miyake | 360/78.04 X |
| 4,710,832 | 12/1987 | Itoh | 360/78.04 X |
| 4,734,799 | 3/1988 | Miyake | 360/78.04 X |
| 4,811,133 | 3/1989 | Nakadai et al. | 360/78.11 X |
| 4,825,324 | 4/1989 | Miyake et al. | 360/78.06 X |
| 4,843,496 | 6/1989 | Marchetti | 360/77.06 |

*Primary Examiner*—Alan Faber
*Assistant Examiner*—David L. Robertson

[57] ABSTRACT

A magnetic recording/reproducing device which has a track search function to discriminate a recorded track from an unrecorded track for all tracks formed in a magnetic disc. In the magnetic recording/reproducing device, in accordance with signals output from a magnetic head when the magnetic head is moved to positions lying at least adjacent to the central position of a track accessed, with a predetermined position on the magnetic disc designated as a reference position, it is determined whether each accessed track is a recorded track or an unrecorded track. Data representing the check results are stored in memory corresponding to the track numbers respectively given to the tracks. This assures an accurate track search.

11 Claims, 7 Drawing Sheets

MAGNETIC RECORDING/REPRODUCING DEVICE WHICH DISCRIMINATES RECORDED AND UNRECORDED TRACKS

BACKGROUND OF THE INVENTION

1. Field of the Invention

The present invention relates to a magnetic recording/reproducing device and, in particular, to a magnetic recording/reproducing device which is provided with a track search function.

2. Description of the Related Art

In a magnetic recording/reproducing device for use in an electronic still camera or the like, a video signal which represents an image is to be recorded in a magnetic recording medium such as a magnetic disc having a small aperture and the like. In the magnetic disc, a number of, for example, 50 tracks are formed concentrically at substantially regular intervals. In the respective tracks, one field of video signals corresponding to one frame is recorded in the sequential order beginning with the start track of the unrecorded tracks thereof. In the light of this, in order to be able to record the video signal at once responsive to a recording instruction, it is preferable to have previously arranged a magnetic head on the start track of the unrecorded tracks. In particular, in an apparatus such as an electronic still camera with which shutter timing is important, it is necessary to execute a track search at a high speed prior to photographing in order to check whether all of the tracks accessed, have been previously recorded on or not.

In view of this, in the above-mentioned type of electronic still camera, the magnetic head is moved at a track pitch over all tracks, a signal is read out only once from one position in each of the tracks sequentially accessed by the magnetic head, and, in accordance with the signal, it is determined whether or not the accessed track has been recorded on.

However, due to the fact that in the above-mentioned track search the magnetic head is moved at the track pitch and the signal is read out only once, if the magnetic disc is expanded or contracted by the effect of temperatures or the like, the magnetic head may be moved to a position which is out of the actual track, with the result that the signal cannot be read out accurately. In other words, there is a problem in the above-mentioned conventional device that the determination of whether or not the accessed track is recorded on is in error.

Also, when any possible deformation in the magnetic disc results in poor contact between the magnetic head and the magnetic disc, or when the magnetic head has a varying frequency characteristic, the level of the reproducing output of the device is caused to vary. As a result of this, similarly as in the above-mentioned case, the determination of whether or not the accessed track is recorded on may be in error.

SUMMARY OF THE INVENTION

The present invention aims at eliminating the drawbacks found in the above-mentioned conventional devices.

Accordingly, it is an object of the invention to provide a magnetic recording/reproducing device which is capable of performing an accurate track search to discriminate a recorded track from an unrecorded track.

In order to attain the above object, according to the invention, there is provided a magnetic recording/reproducing device in which a magnetic head is moved over all of the tracks provided in a magnetic recording medium such as a magnetic disc or the like, and a track search is performed to check whether an accessed track is recorded on or not in accordance with a signal output from the magnetic head, after each movement of the magnetic head, and to store the result thereof, the magnetic recording/reproducing device comprising: head moving means for moving the magnetic head in the radial direction of the magnetic recording medium with a predetermined position set on the movement path of the magnetic head as a reference position; signal processing means for processing the signal output from the magnetic head into a predetermined form; storage means for storing the check result; and, control means for performing a track search to check whether the accessed track is recorded on or not in accordance with the signal output from the magnetic head when the head moving means is driven or controlled and the magnetic head that is moved in the radial direction of the magnetic recording medium by means of the driving control is positioned at a position at least adjacent to the central position of the track that is accessed with the predetermined position as the reference, and to control the storage means to record the check result.

In the magnetic recording/reproducing device according to the invention, the control means performs a track search by driving and controlling the head moving means such that the magnetic head can be moved in the radial direction of the magnetic recording medium with the predetermined position set on the movement path thereof as the reference, and by checking whether the accessed track is recorded on or not in accordance with the signal output when the magnetic head is positioned at the position that is at least adjacent to the central position of the track that is accessed with the predetermined positioned as the reference and controlling the storage means to store the check result.

As described above, discrimination of a recorded track from an unrecorded track in the track search is executed in accordance with the signal that is output from the magnetic head when the magnetic head is positioned at a position at least adjacent to the central position of the track that is accessed with the predetermined position set on the movement path of the magnetic head as the reference, so that the track search can be performed with accuracy.

BRIEF DESCRIPTION OF THE DRAWINGS

The exact nature of this invention, as well as other objects and advantages thereof, will be readily apparent from consideration of the following specification relating to the accompanying drawings, which are given by way of illustration only, and thus are not limitative of the present invention, in which like reference characters designate the same or similar parts throughout the figures thereof and wherein.

DETAILED DESCRIPTION OF THE INVENTION

Detailed description will hereunder be given of the preferred embodiments of a magnetic recording/reproducing device according to the present invention with reference to the accompanying drawings.

Figure 1:
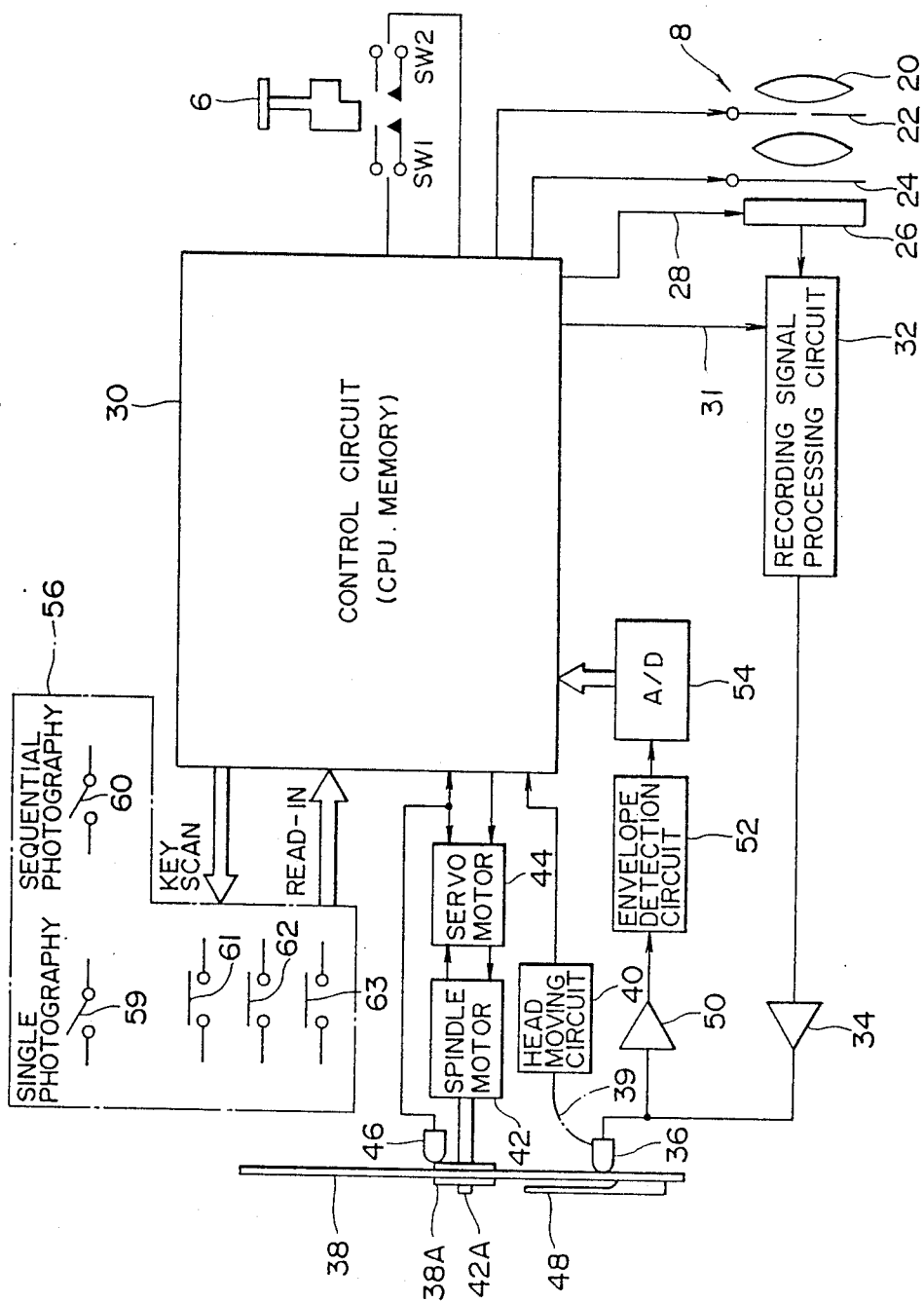
FIG. 1 is a view of the whole structure of a first embodiment of an electronic still camera which utilizes a magnetic recording/reproducing device according to the invention.

Referring first to FIG. 1, there is shown a view of the whole structure of a first embodiment of an electronic still camera to which utilizes a magnetic recording/reproducing device. In this figure, an image pickup optical system, designated by 8, is composed of a taking lens system 20 for focusing an image of an object, a diaphragm 22 and an optical shutter 24. The diaphragm 22 and optical shutter 24 are driven and controlled by a control unit 30 in accordance with a light reception signal which is obtained from a light receiving element which is not shown but disposed in a light path, and also the optical shutter 24 is adapted to respond to a switch SW2 which can be closed by depressing a shutter release button 6.

The shutter release button 6, in this embodiment, can be operated in a two-stroke manner and, in the first stroke thereof, power is supplied to the respective parts of the present device responsive to the closing of a switch SW1. As a result of this, a spindle motor 42, which drives a magnetic disc 38 as a magnetic recording medium in accordance with a drive signal from a servo circuit 44 to be described later, is actuated and at the same time the taking lens system 20 is moved in the direction of an optical axis by a lens moving mechanism which is not shown, so that automatic focusing can be achieved.

Further, in the second stroke of the shutter release button 6, the control unit 30 operates such that the shutter release, photographing, and recording operations can be executed. As a result of the above-mentioned structure, the possibility of an power drain on the power source is eliminated.

In the focal plane of the image pickup optical system 8, there is arranged a solid image pickup element 26 which includes a two-dimensional image pickup cell array such as a CCD or the like. The video data that is accumulated in the solid image pickup element 26 is read out in the form of a serial video signal in synchronization with a drive signal 28 including the vertical and horizontal synchronization signals that are output from the control unit 30. The brightness signal component and color difference signal component of the serial video signal are frequency modulated in a recording signal processing circuit 32 in accordance with a control signal 31 output from the control unit 30, then these frequency modulated signals are combined into one (that is, an FM video signal), and the FM video signal is thereafter sent to a recording amplifier 34. The FM video signal is amplified up to a predetermined level by the recording amplifier 34 and is then supplied to a magnetic head 36.

The magnetic recording head 36 is a magnetic conversion element which is carried by a head moving mechanism, shown conceptually by a one-dot chained line 39, which is moved by a head moving circuit 40 onto, one, of unrecorded tracks in the magnetic disc 38, and which records the FM video signal in the unrecorded track. The head moving mechanism 39 is driven and controlled by a drive pulse output from the head moving circuit 40. The head moving mechanism 39 includes a stepping motor (not shown) and the magnetic head 36 is moved in proportion to the angle of rotation of the stepping motor. For example, the stepping motor is rotated about 18° per drive pulse output the head moving circuit 40, which causes the magnetic head 36 to be moved about 5 $\mu$m (1 pitch) in the radial direction of the magnetic disc 38. As a result of this, the movement of the magnetic head 36 can be carried out very accurately. Also, the head moving circuit 40 is controlled in accordance with a drive signal output from the control unit 30. The magnetic disc 38 has a core 38A which can be removably mounted to a shaft of rotation 42A to be driven by a spindle motor 42.

Figure 2:
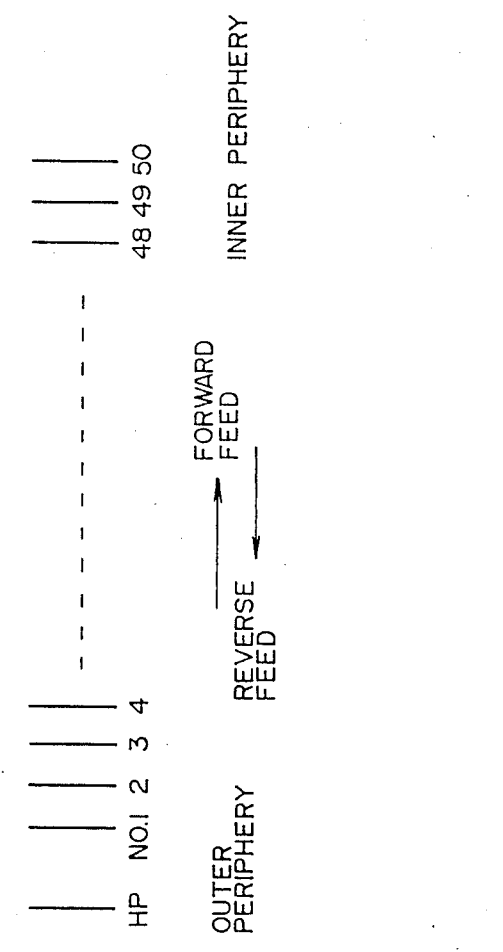
FIG. 2 is a explanatory view illustrating the track arrangement in a magnetic disc and the position of home position.

The magnetic disc 38 is rotatably stored in a disc pack and is then loaded into a pack holder (not shown). In the magnetic disc 38, for example, in a magnetic recording disc having a small aperture with a diameter of the order of 47 mm, there are formed 50 tracks in a concentrical manner, with the track pitch of the order of 100 $\mu$m, that is, with the track width of the order of 60 $\mu$m and the guard band width of the order of 40 $\mu$m. In FIG. 2, there is shown a relation between the magnetic disc 38 and the home position HP of the magnetic head 36. The 50 tracks formed concentrically on the magnetic recording plane of the magnetic disc 36 are respectively given track Nos. of No. 1 to No. 50 in sequential order beginning from the outer-most track. The home position HP is outside the No. 1 track. The home position HP is not set in the magnetic disc 38, but it is a limiting position which is laid out on the moving path of the magnetic head 36. The home position HP can be detected by a home position switch 63. To move the magnetic head 36 from the outer side of the magnetic disc 38 toward the inner side thereof is a forward feed, and the movement in the reversed direction is a reversed feed.

A regulation plate 48 is located at a position which is opposed to the magnetic head 36 with the magnetic disc 38 between them. Also, adjacent to the core 38A of the magnetic disc 38, there is arranged a phase detector 46 which detects a PG yoke of a magnetic substance provided in the core 38A but (not shown) and generates a phase detection pulse PG every rotation of the magnetic disc 38.

The phase detection pulse PG of the phase detector 46 is input to a servo circuit 44 and the control unit 30. A signal (a frequency signal FG) having a frequency proportional to the number of rotations of the spindle motor 42 is output from a frequency generator (not shown) which is provided in the spindle motor 42, and the frequency signal FG is output to the servo circuit 44.

In accordance with the phase detection pulse PG and frequency signal FG, the servo circuit 44 controls the spindle motor 42 such that the magnetic disc 38 is rotated at a given number of rotations, for example 3,600 rpm. This enables the FM video signal to be recorded in the respective tracks of the magnetic disc 38 at a field speed or at a frame speed.

In the track search processing and the like, the read signal of the magnetic head 36 is input through a preamplifier 50 to an envelope detection circuit 52. The envelope detection circuit 52 is a detection circuit which detects the read signal of the magnetic head 36, that is, the envelope of the FM signal that is recorded in the track of the magnetic disc 38, and then outputs a direct current voltage signal corresponding to the envelope of the FM signal. The direct current voltage signal representing the envelope is input to an analog/digital converter (A/D converter) 54, where it is converted to an 8-bit digital signal representing a quantization level of, for example, 256 and is then input to the control unit 30.

The envelope detection signal is used to check whether a track on the magnetic disc 38 is recorded on or not. That is, if the level of the detection signal that is obtained when the magnetic head 36 is moved across the track does not reach a given threshold level, then it is decided that the track has not been recorded on, and if the detection signal level reaches the threshold level, it is decided that the track is recorded on.

The control unit 30 is a circuit which manages and controls the whole device, and it is composed of a central processing unit, preferably a microprocessor (which will be referred to as CPU hereinafter), a memory to store the programs of the control unit 30 and the necessary data thereof, a counter CN to count the number of movements of the tracks of the magnetic head 36 (the count value N), and interfaces interposed between the control unit 30 and various elements, circuits, devices and the like which are located around the control unit 30. The control unit 30 controls the rotation of the above-mentioned magnetic disc 38, the recording of the FM video signal and the track search and, in addition to this, reads various kinds of switches to be described later and controls the operation of the camera in accordance with the read results. In the control unit 30, in particular, in the memory thereof, there is provided a flag $T_N$ which is used to descriminate a recorded track from an unrecorded track in the track search. The flag $T_N$ is considered as reset ($=0$) in the initialization processing.

Also, a group of switches 56 is connected to the control unit 30. The switch group 56 includes a single photographic mode switch 59 which is used to select a single photographic mode in which a frame of still image is recorded in the magnetic disc 38 each time the shutter release button 6 is depressed, and a sequential photographic mode switch 60 for selecting a sequential photographic mode in which, while the shutter release button 6 is being depressed, still images are photographed frame by frame every given time (for example, 1/6 sec. or 1/10 sec.) and then the still images are sequentially recorded in the magnetic disc 38.

Also, in the switch group 56, there are included a load end switch 61 to detect that the disc pack holder is closed up to a position where it can be surely mounted to the rotational shaft 42A of the spindle motor 42, a pack switch 62 to detect that the disc pack is stored in the closed pack holder and a home position switch 63 to detect the above-mentioned home position. The control unit 30 performs a key scan routine every given period (for example, 1/60 sec.), and in this key scan routine the control unit 30 sends out a key scan pulse to the above-mentioned switch group, detects the closing and opening of the switches in accordance with whether the pulse has come back or not, and stores the results in the memory.

Next, description will be given below of the processing procedures of the track search in the electronic still camera constructed in the above-mentioned manner with reference to a flow chart shown in FIG. 3.

Figure 3:
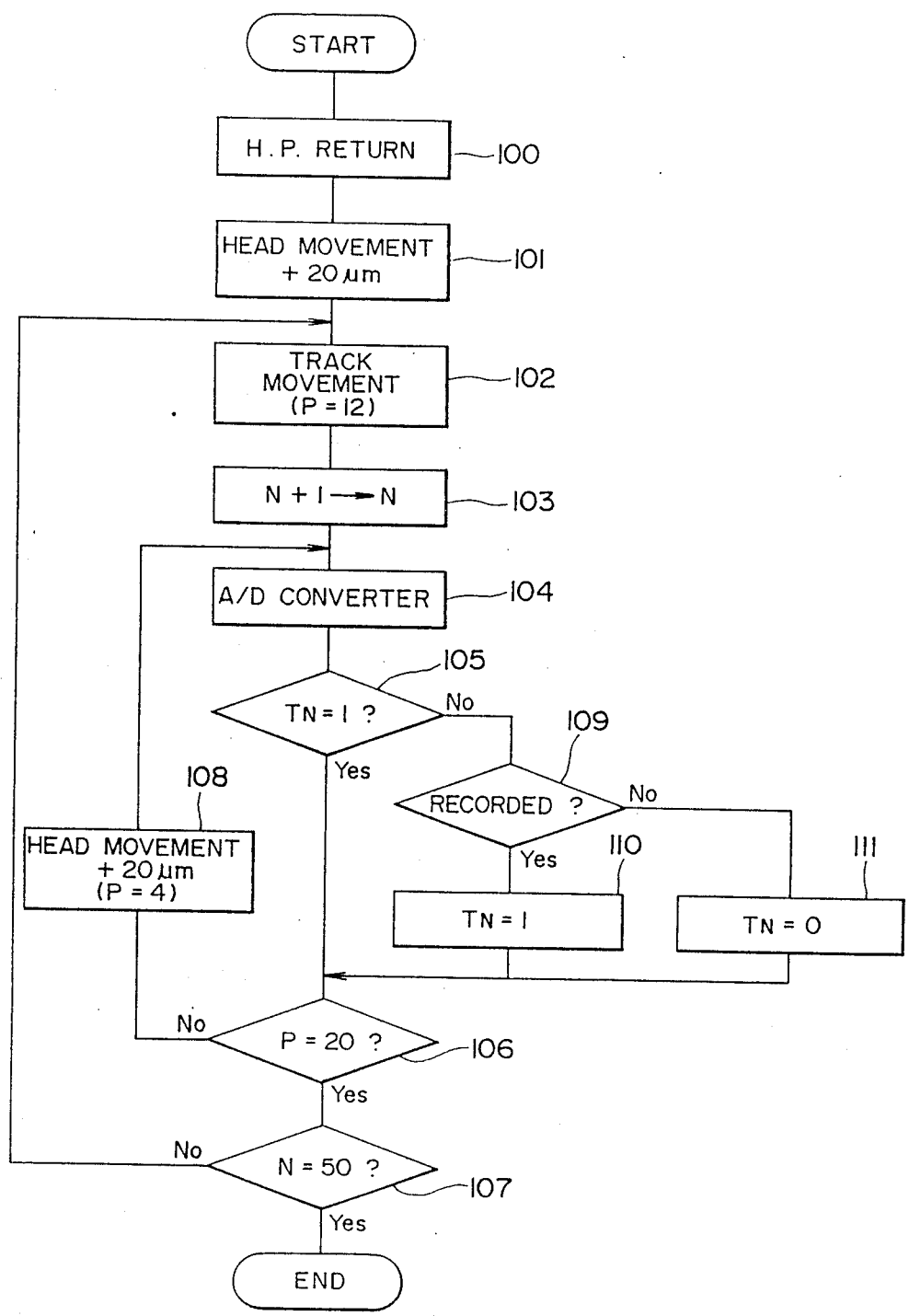
FIG. 3 is a flow chart illustrating the processing order of a track search to be executed by the magnetic recording/reproducing device shown in FIG. 1.

The control unit 30, after the switch SW1 of the shutter release button 6 is closed, detects from the load end switch 61 and pack switch 62 that the disc pack with the magnetic disc 38 stored therein is inserted in the pack holder and the pack holder is closed, and starts the processings shown in FIG. 3 when both switches, 61 and 62 are closed.

Figure 4:
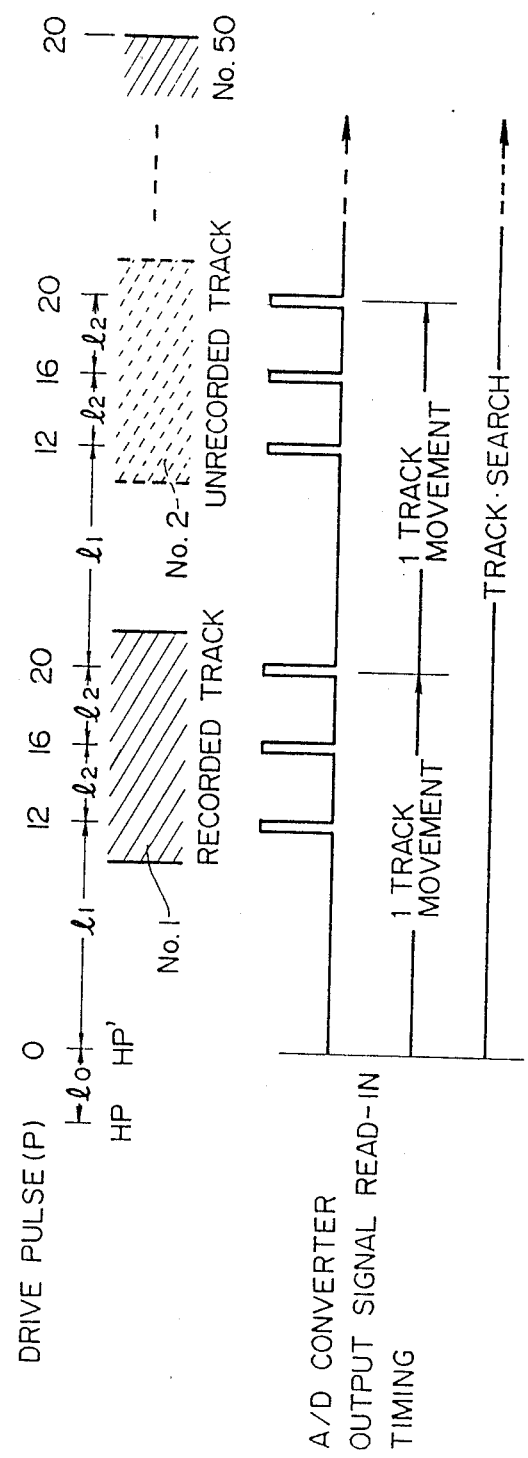
FIG. 4 is an explanatory view illustrating movement of a magnetic head.

After it is detected that both switches 61 and 62 are closed, the control unit 30 drives and controls the head moving circuit 40 to return the magnetic head 36 from its current position to the home position HP (Step 100). Further, the control unit 30 moves the magnetic head 36 from the home position HP to a position which lies closer by a distance $l_0$ toward the internal peripheral side of the magnetic disc 38, and sets the position as a provisional home position HP' that is used for the track search (FIG. 4). In this embodiment, the provisional home position HP' is set at a position which is spaced from the normal home position HP by the distance $l_0$ of 20 μm. For this reason, the control unit 30 outputs to the head moving circuit 40 a drive signal which gives the stepping motor 4 drive pulses to move the magnetic head 36 by 20 μm in the forward direction (Step 101).

After the home position HP' is set, by using the home position HP' as a reference position the movement of the magnetic head 36 over the tracks is started (Step 102), and the number of the tracks that have been accessed by the magnetic head 36 is counted ($N+1\rightarrow N$) by the counter CN (Step 103). In the track movement by the magnetic head 36 in Step 102, the control unit 30 outputs to the head moving circuit 40 a drive pulse to give the stepping motor 12 drive pulses for moving the magnetic head 36 by a distance $l_1$ of 60 μm from the reference position HP'.

As a result of this, the magnetic head 36 is moved to a position adjacent to the central position of the No. 1 track to be first accessed by it, and the FM video signal that is read out from the accessed track is envelope detected and is then A/D converted by the A/D converter 54 (Step 104) (see FIG. 4). After the processing in Step 104 is completed, whether the relevent accessed track is a recorded track or not is first checked in accordance with the flag $T_N$ (Step 105). Since in the decision in Step 105 in the first execution of the routine the flag $T_N$ remains initialized ($T_N=0$), the program advances to Step 109.

In Step 109, whether the level of the envelope detection signal that was A/D converted by the A/D converter 54 reaches a given threshold level is checked. If it is found that the level of the envelope detection signal reaches the threshold level, then the track is decided to be a recorded track, and thus the flag $T_N$ is set ($=1$) (Step 110). The states of the flag $T_N$ are sequentially stored in the memory corresponding to the track Nos.

After the processing in Step 110 is completed, the program advances to Step 106, where whether the magnetic head 36 is moved by a track is checked or decided. This decision is executed in accordance with the number P of the drive pulses output since the magnetic head reached the reference position in view of the fact that, if 20 drive pulses are output to the stepping motor, then the magnetic head can be moved by a distance of 100

μm which corresponds to a track. If it is found that the number P has not reached 20, then the program goes to Step 108. In Step 108, 4 drive pulses are output to the stepping motor, with the result that the magnetic head 36 is further moved by a distance $l_2$ of 20 μm toward the inner peripheral side of the magnetic disc 38, whereby the magnetic head 36 is moved to a position substantially above the center of the track to be accessed (see FIG. 4).

Then, after the magnetic head 36 is moved to a predetermined position, the converter 54 A/D convertes the envelope detection signal (Step 104), and the control unit 30 checks whether the flag $T_N$ is set (=1) or not (Step 105). In this case, because the flag $T_N$ is set (=1) in the above-mentioned Step 110, the program moves to Step 106 without checking the level of the envelope detection signal. In Step 106 whether the number of drive pulses has reached 20 or not is checked again but it is found that the number has reached only 16, with the result that the program goes back again to Step 108. In Step 108, the control unit 30 outputs to the head moving circuit 40 a drive signal for driving the stepping motor 4 drive pulses to move the magnetic head 36 further by a distance of 20 μm from the central position of the track toward the internal peripheral side of the magnetic disc (see FIG. 4). As a result of this, the magnetic head 36 is moved 100 μm (1 track) from the reference position (home position HP') toward the internal peripheral side of the magnetic disc, and the position to which the magnetic head 36 has been moved by the distance of 1 track is then set as a reference position for the next track movement.

Thereafter, the converter 54 A/D converts the envelope detection signal and the control unit 30 checks the flag $T_N$ (Steps 104, 105), thereby allowing the program to proceed to Step 106. Because the number P of drive pulses in the third check in Step 106 has reached 20, the program advances to Step 107.

On the other hand, separately from the above operation, if the level of the envelope detection signal has not reached the threshold level in the first check in the above-mentioned Step 109, then the track is decided as an unrecorded track, so that the reset state (=0) of the flag $T_N$ is allowed to continue (Step 111). The, states of the flag $T_N$ are stored in the memory corresponding to the track Nos.

As mentioned above, in the present embodiment, when the control unit 30 decides that the track being currently accessed by the magnetic head 36 by the distance $l_2$ of 20 μm further from the current position thereof toward the inner peripheral side of the magnetic disc (see FIG. 4), the movement of the magnetic head is executed once more by means of Step 108. By means of the last mentioned operations, likewise as discussed before, when the magnetic head 36 is located at the center of the track being currently accessed and at positions thereof lying further nearer toward the inner peripheral side of the magnetic disc, whether the track is a recorded track or an unrecorded track is checked by the control track 30 in accordance with the envelope detection signals that are input to the control unit 30 through the envelope detection circuit 52 and A/D converter 54. In other words, the control unit 30 checks three times as to whether the track is a recorded track or an unrecorded track in accordance with the envelope detection signals of the FM video signals that are respectively read out from the positions where the magnetic head 36 are moved 60 μm, 80 μm, and 100 μm, respectively from the reference position (HP'). And, after the magnetic head 36 is moved 1 track, the program advances to Step 107.

Now, in Step 107, whether the number N of the tracks that has been accessed by the magnetic head 36 has reached 50 or not is checked, and, if it is found that the value of N is less than 50, then it is decided that the track search over all of the tracks is not completed. If the track search is not completed, then the program goes back to Step 102, where the track movement is executed similarly as in the before-mentioned case. That is, for each of the tracks No. 1 to No. 50, whether it is a recorded track or an unrecorded track is checked, and the check results are stored in the memory.

As described above, in the track search in the above-mentioned embodiment of the magnetic recording/reproducing device according to the invention, whether the track being accessed is a recorded track or an unrecorded track is checked three times in accordance with the envelope detection signals of the FM video signals that are respectively read out at the three different positions of the track where the track is accessed by the magnetic head 36. As a result, even when the magnetic disc 38 is expanded or contracted due to heat and the like, or even when the reproduction outputs of the magnetic head vary, the recorded and unrecorded tracks can be discriminated from each other accurately, because the FM video signal is read out and envelope detected at least once.

Also, since the signal read-out for the discrimination is performed while moving the magnetic head 36, the track search over all tracks can be completed in a short time.

By the way, as the moving sequence of the magnetic head 36 for the track search, there is employed a well known moving sequence in which the magnetic head 36 is moved every track pitch, which eliminates the possibility that the control of the whole device is complicated.

Figure 5:
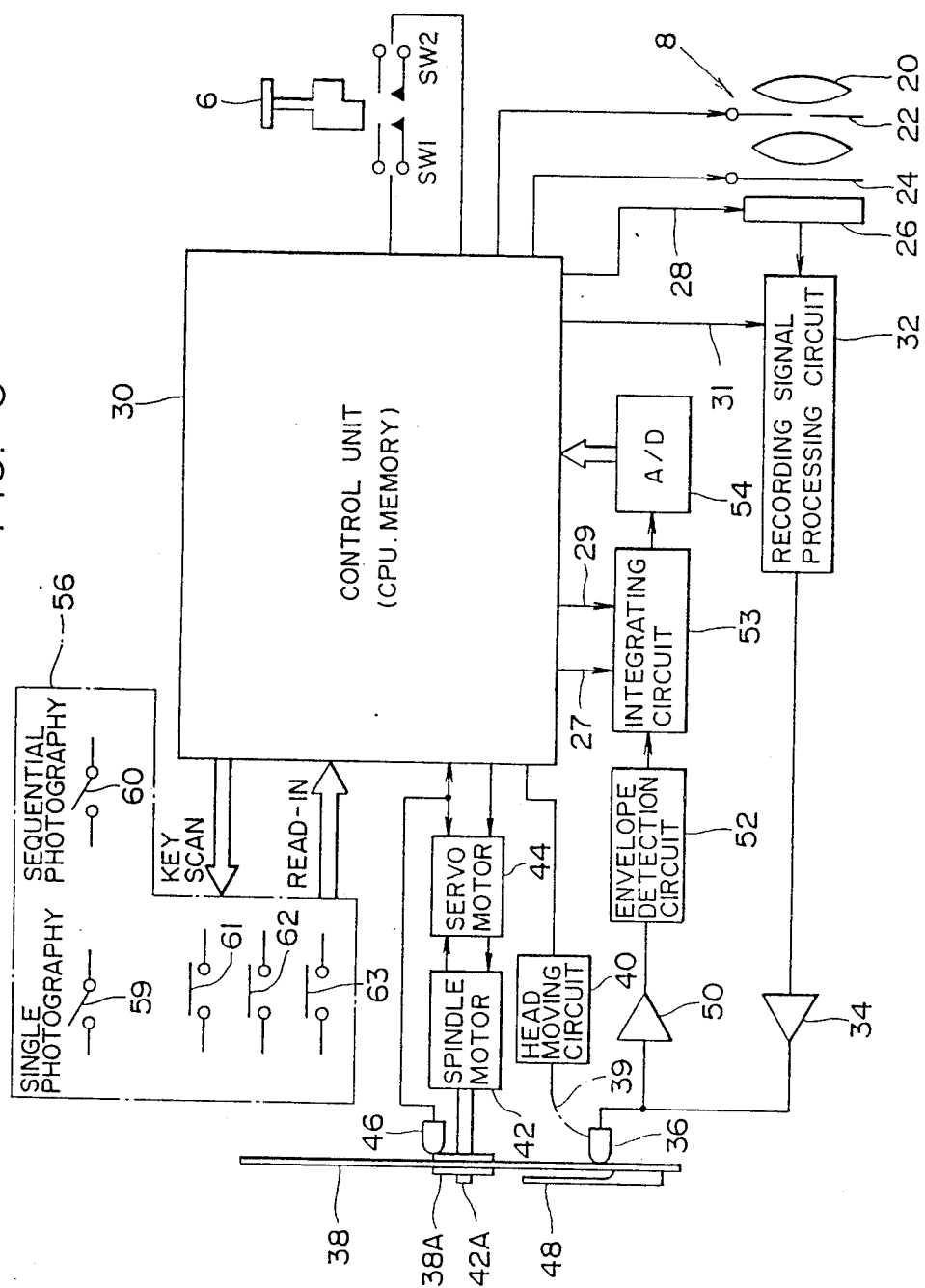
FIG. 5 is a view of the whole structure of a second embodiment of an electronic still camera which utilizes a magnetic recording/reproducing device according to the invention.

Next, in FIG. 5, there is shown the whole structure of a second embodiment of an electronic still camera which utilizes a magnetic recording/reproducing device according to the invention. In FIG. 5, the same parts that are shown in FIG. 1 are given the same designations, respectively, and the description thereof is omitted. The second embodiment shown in FIG. 5 is different from the first embodiment in FIG. 1 in that a detection signal from the envelope detection circuit 52 is integrated for a given time by an integrating circuit 53 and the integrated detection signal is A/D converted by the A/D converter 54. Also, the integrating circuit 53 starts and terminates the integration, and resets the integration value to 0, in accordance with control signals 27, 29 output from the control unit 30.

Now, description will be given below of the processing procedures of a track search in the electronic still camera constructed in the above-mentioned manner with reference to a flow chart shown in FIG. 6.

Figure 6:
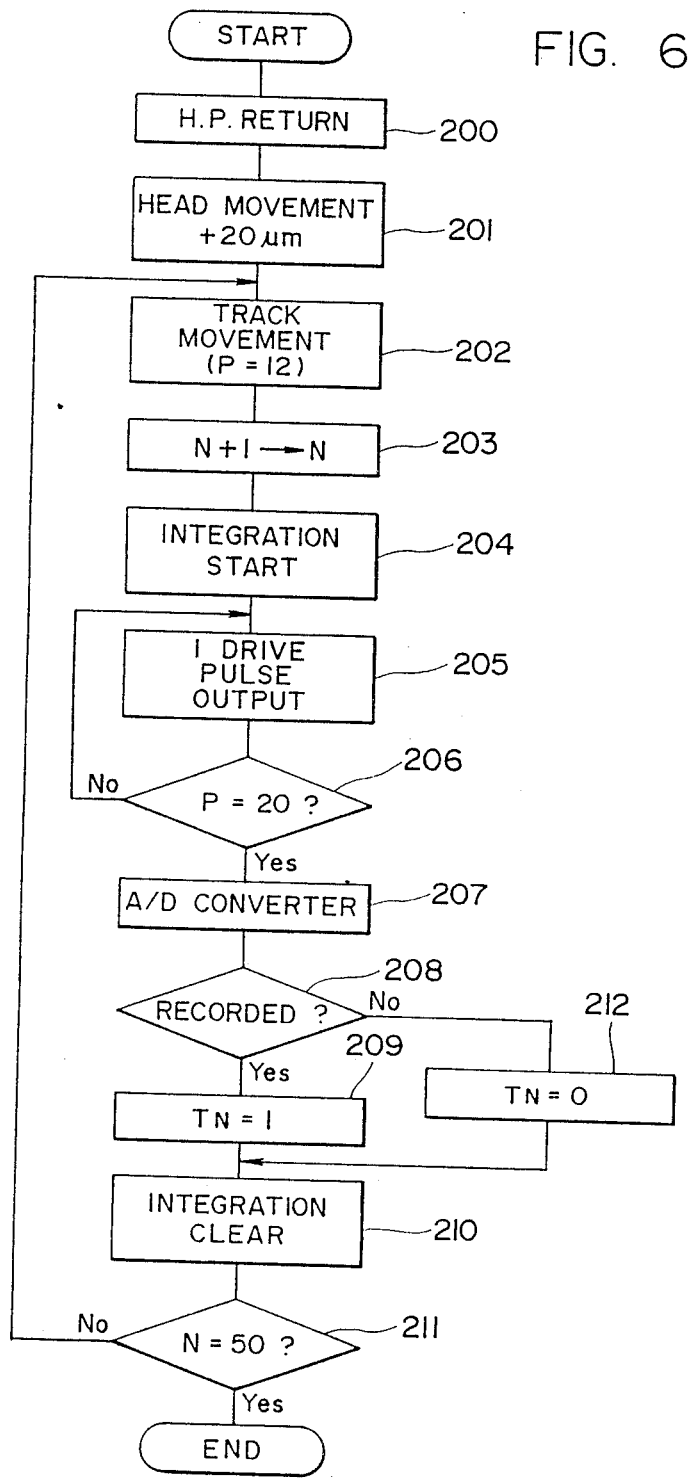
FIG. 6 is a flow chart illustrating the processing order of a track search to be executed by the magnetic recording/reproducing device shown in FIG. 5; and, FIG. 7 is an explanatory view illustrating movement of a magnetic head in the second embodiment.

The control unit 30 starts the processings shown in FIG. 6 when the disc pack is normally loaded in the pack holder and the switch SW1 of the shutter release button 6 is closed.

Figure 7:
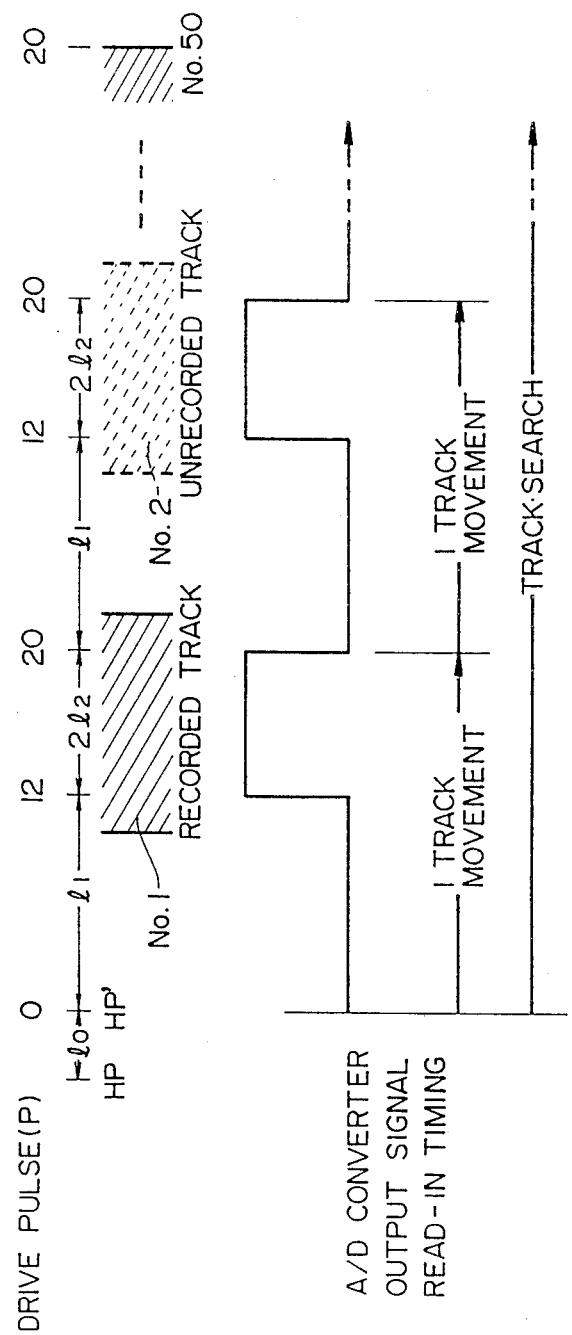

Specifically, after the control unit 30 detects that the disc pack is loaded in the pack holder, it drives and controls the head moving circuit 40 to return the magnetic head 36 from its current position to the home position HP (Step 200). Then, the control unit 30 moves the magnetic head 36 further by the distance $l_0$ from the home position HP toward the inner peripheral side of the magnetic disc 38, and sets this position as the provisional home position HP' for the track search as in the before-mentioned first embodiment (see FIG. 7). In the second embodiment, the home position HP' is set at a position a distance $l_0$ of 20 μm from the normal home position HP. Accordingly, the control unit 30 outputs a drive signal to the head moving circuit 40 which supplies the stepping motor with 4 pulses to move the magnetic head 36 by 20 μm in the forward direction thereof (Step 201).

When the home position HP' is set, the track movement of the magnetic head 36 is started with the home position HP' as a reference position (Step 202), and the number of the tracks that have been accessed by the magnetic head 36 is counted (N+1→N) by the counter CN (Step 203). In the track movement of the magnetic head 36 in Step 202, the control unit 30 outputs a drive signal to the head moving circuit 40 which supplies the stepping motor with 12 pulses for moving the magnetic head 36 by the distance $l_1$ of 60 μm from the reference position. As a result of this, the magnetic head 36 is moved to a position adjacent to the central position of the track No. 1 to be accessed first (see FIG. 7) and, in concert with this, the FM video signal that is read out from the accessed track is envelope detected and is then input to the integrating circuit 53. The control unit 30 outputs a control signal to the integrating circuit 53 to start the integration of the envelope detection signal (Step 204). The integrating operation of the integrating circuit 53 is continued until 20 drive pulses are supplied to the stepping motor (Steps 205, 206) (see FIG. 7). As a result of this, the read-out of the FM video signal is continued until the magnetic head 36 is moved by a distance $2l_2$ of 40 μm from a position lying 20 μm before the central position of the track No. 1 being accessed toward the inner peripheral side of the magnetic disc. Therefore, even if the track is displaced tens of μm toward the outer or inner peripheral side of the magnetic disc, the peak value of the integrated envelope detection signal can be obtained.

The output signal from the integrating circuit 53 is A/D converted by the A/D converter 54 (Step 207), and is then input to the control unit 30. The control unit 30 checks whether the level of the A/D converted envelope detection signal has reached a given threshold level. In this checking, when the level of the envelope detection signal has reached the given threshold level, the relevent track is decided to be a recorded track and thus the flag $T_N$ is set (=1) (Step 209). On the other hand, when the level of the envelope detection signal has not reached the threshold level, the track is decided to be an unrecorded track and thus the flag $T_N$ is reset (=0) (Step 212). The states of the flag $T_N$ are to be stored in the memory corresponding to the track Nos.

After completion of the above decision or discrimination of the recorded tracks from the unrecorded tracks, the control unit 30 stops outputting the control signal to the integrating circuit 53 to cease the integrating operation thereof, and outputs the control signal 29 to thereby initialize the integrated value of the integrating circuit 53 (Step 210). And, if the number N of the tracks that are accessed by the magnetic head 36 is less than 50, then, in accordance with the decision in Step 211, the program goes back to Step 202. The same processings are executed repeatedly until the track search over all tracks is completed.

As described above, in the track search of the present embodiment in an electronic still camera, whether the track being accessed is a recorded track or an unrecorded track is checked in accordance with the integration value of the envelope detection signals of the FM video signals respectively read out from the different positions of the track accessed by the magnetic head 36. As a result, even when the magnetic disc 38 is expanded or contracted due to heat or the like, or even when the reproduction outputs of the magnetic head vary, the FM video signal can be read out accurately and can be envelope detected, so that discrimination of the recorded tracks from the unrecorded tracks can be achieved accurately. Also, since the read-out of the signals for the discrimination is executed while moving the magnetic head 36, the track search over all tracks can be completed in a short time. Further, due to the fact that, as a sequence for moving the magnetic head 36 for the track search, there is employed a well known sequence in which the magnetic head 36 is moved every track pitch, there is eliminated the possibility that the control of the whole device is complicated.

As has been described hereinbefore, in the magnetic recording/reproducing device according to the invention, to perform the track search, the magnetic head is moved in the radial direction of the magnetic recording means with a predetermined position set on the moving path of the magnetic head as a reference position, and at the same time, whether the track that is accessed by the magnetic head is a recorded track or an unrecorded track is checked in accordance with the signals that are output when the magnetic head is located at positions at least adjacent to the central position of the accessed track with the predetermined position as the reference position and the check result is stored in the memory means. As a result, the track search can be carried out accurately.

It should be understood, however, that there is no intention to limit the invention to the specific forms disclosed. On the contrary, the invention is intended to cover all modifications alternate constructions and equivalents falling within the spirit and scope of the invention as expressed in the appended claims.

What is claimed is:

1. A track search device in a magnetic recording/reproducing apparatus for performing a track search in which a magnetic head is moved over each track formed in a magnetic recording medium, such as a magnetic disc or the like, and which determines if a track accessed by a magnetic head is a recorded track or an unrecorded track in accordance with signals output from the magnetic head while it is moved, the track search device comprising:

head moving means for moving the magnetic head in the radial direction of the magnetic recording medium from a predetermined position set on the magnetic recording medium;

an envelope detecting circuit for envelope detecting signals output from the magnetic head;

input means for inputting the output signal of said envelope detecting circuit to a decision means each time the magnetic head is moved by said head moving means to each of a plurality of different positions within a predetermined track width of a track to be accessed based on said predetermined position, said decision means determining that an accessed track is a recorded track when at least one of a plurality of signals input from said inputs means respectively corresponding to said plurality of different positions exceeds a predetermined threshold value, and for determining that an accessed track is an un-recorded track when all of said plurality of signals are less than said predetermined threshold value; and storage means for storing the decision results of said decision means for each track.

2. A track search device in a magnetic recording/reproducing apparatus for performing a track search in which a magnetic head is moved over each track formed in a magnetic recording medium, such as a magnetic disc or the like, and which determines if a track accessed by a magnetic head is a recorded track or an un-recorded track in accordance with signals output from the magnetic head while it is moved, the track search device comprising:

head moving means for moving said magnetic head in the radial direction of the magnetic recording medium from a predetermined position set on the magnetic recording medium;

an envelope detecting circuit for envelope detecting signals output from the magnetic head;

an integrating circuit for integrating the output signals of said envelope detecting circuit;

input means for actuating said integrating circuit and inputting the integrated envelope detected output to a decision means while said magnetic head is moved by said head moving means at least along a predetermined region adjacent to the central position of a track to be accessed based on said predetermined position, said decision means determining that an accessed track is a recorded track or an un-recorded track in accordance with whether said integrated envelope detected output, input from said input means, exceeds a predetermined threshold value; and storage means for storing the decision results of said decision means for each track.

3. A magnetic recording/reproducing apparatus with a track search function, for determining if a plurality of tracks of a magnetic recording medium are recorded tracks or unrecorded tracks, comprising:

magnetic head means for outputting a read signal corresponding to an accessed track of said plurality of tracks of the magnetic recording medium;

magnetic head moving means, for moving said magnetic head means radially along the magnetic recording medium from a predetermined home position to sequentially access each of the plurality of tracks, each track accessed by said magnetic head means at a plurality of positions within a predetermined track width with respect to the center of each track and said home position;

envelope detecting means for envelope detecting said read signals; and decision means for determining if an accessed track is a recorded track or an unrecorded track based upon whether a plurality of envelope detected read signals respectively corresponding to said plurality of positions within the accessed track exceeds a predetermined threshold value.

4. The magnetic recording/reproducing apparatus of claim 3 further comprising storage means for storing the decision results for each of the plurality of tracks.

5. The magnetic recording/reproducing apparatus of claim 3 further comprising A/D conversion means for A/D converting the output of the envelope detecting means to output said envelope detected read signal.

6. The magnetic recording/reproducing apparatus of claim 5 in which said decision means determines that an accessed track is a recorded track when at least one of said plurality of envelope detected read signals respectively corresponding to said plurality of positions within the accessed track exceeds said predetermined threshold value and determines that an accessed track is an unrecorded track when all of said plurality of envelope detected read signals corresponding to said plurality of positions within the accessed track are less than said predetermined threshold value.

7. The magnetic recording/reproducing apparatus of claim 3 wherein said decision means comprises integrating means for integrating said plurality of envelope detected read signals respectively corresponding to said plurality of positions within the accessed track, said decision means determining that an accessed track is a recorded track or an unrecorded track in accordance with whether said integrated envelope detected read signals exceeds said predetermined threshold value.

8. A method of determining in a magnetic recording/reproducing apparatus whether a plurality of tracks of a magnetic recording medium are recorded tracks or unrecorded tracks comprising the steps of:

moving a magnetic head from a predetermined home position of the magnetic recording medium to sequentially access each of the plurality of tracks at a respective plurality of positions within a predetermined track width with respect to the center of each respective accessed track and said home position to generate a plurality of read signals;

envelope detecting the plurality of read signals;

determining if an accessed track is a recorded track or an unrecorded track based upon whether a plurality of envelope detected read signals respectively corresponding to said plurality of positions within the accessed track exceeds a predetermined threshold value.

9. The method of determining recorded tracks or unrecorded tracks of claim 8 further comprising the step of storing the decision results for each of the plurality of tracks in a storage means.

10. The method of determining recorded tracks or unrecorded tracks of claim 8 in which said determining step comprises determining that an accessed track is a recorded track when at least one of said plurality of envelope detected read signals respectively corresponding to said plurality of positions within the accessed track exceeds said predetermined threshold value and determining that an accessed track is an unrecorded track when all of said plurality of envelope detected read signals corresponding to said plurality of positions within the accessed track are less than said predetermined threshold value.

11. The method of determining recorded tracks or unrecorded tracks of claim 8 in which said determining step further comprises integrating said plurality of envelope detected read signals respectively corresponding to said plurality of positions within the accessed track and determining that an accessed track is a recorded track or an unrecorded track in accordance with whether said integrated envelope detected read signals exceed said predetermined threshold value.

* * * * *